W. H. THOMAS.
WAGON END-GATE.
No. 174,391. Patented March 7, 1876.
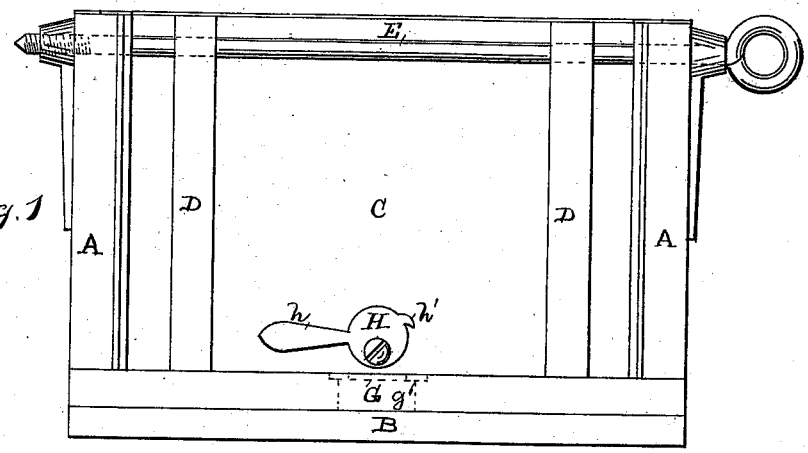
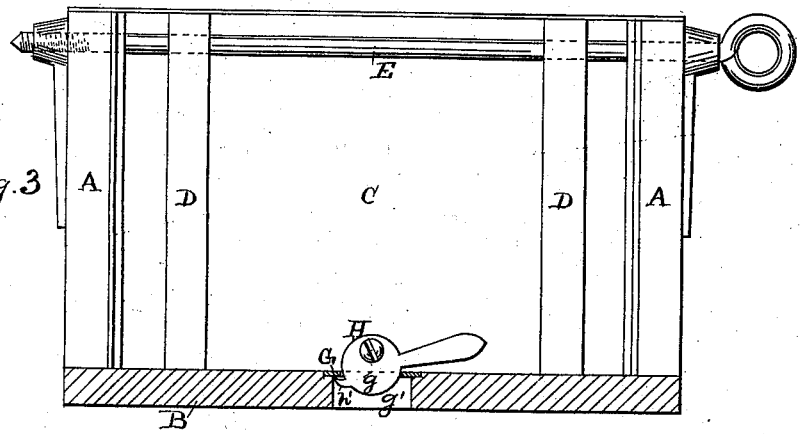
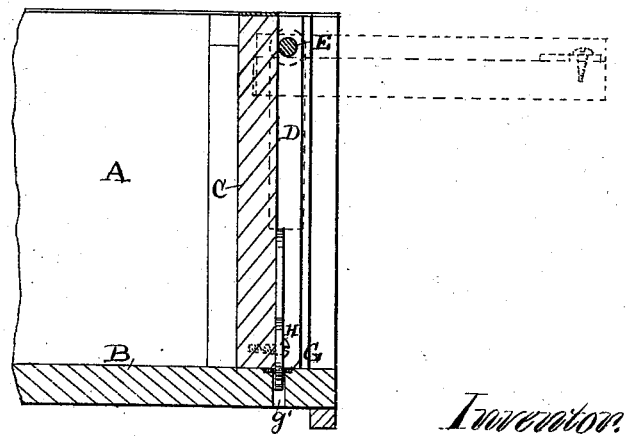
Witnesses:
A. McCallum
D. G. Stuart
Inventor:
Warren H. Thomas,
By W. B. Richards,
Atty.

UNITED STATES PATENT OFFICE.

WARREN H. THOMAS, OF WOODHULL, ILLINOIS, ASSIGNOR OF ONE-HALF HIS RIGHT TO GEORGE W. MILLER, OF SAME PLACE.

IMPROVEMENT IN WAGON END-GATES.

Specification forming part of Letters Patent No. 174,391, dated March 7, 1876; application filed February 1, 1876.

*To all whom it may concern:*

Be it known that I, WARREN H. THOMAS, of Woodhull, in the county of Henry and State of Illinois, have invented certain new and useful Improvements in Fastenings for the End-Gates of Wagons; and I do hereby declare the following to be a full, clear, and exact description thereof, and such as will enable others skilled in the art to which it pertains to make and use the same, reference being had to the accompanying drawing, making a part of this specification, and in which—

Figure 1 is an elevation of an end-gate, and the rear end of a wagon-box embodying my invention. Fig. 2 is a sectional view of Fig. 1 in the line $x\,x$. Fig. 3 is a sectional view through the line $y\,y$ in Fig. 2.

The nature of my invention relates to improvements in fastenings for the end-gates of wagons; and the invention consists in the use of a peculiarly-shaped cam, which may be turned into one position to secure the end-gate and into another to release it, and is provided with a catch or projection for engaging with a slotted plate in the wagon-box bottom, all as hereinafter fully described.

Referring to the parts by letters, letter A represents the sides, and B the bottom, of an ordinary wagon-box. C is the end-gate, secured from splitting by the ordinary stay-bars D. E is the end-gate rod, passing through holes in the side-boards, and also through the bars D, and serving as a journal, on which the end-gate may be swung outward, as shown by dotted lines at Fig. 2. G is a plate secured to the bottom B, and has a slot, $g$, covering or coinciding with a hole, $g'$, in the bottom B, except at one end, where the hole $g'$ extends under the plate G, for purposes hereinafter referred to. H is a cam, provided with a handle, $h$, by which it may be operated, and is so pivoted to the end-gate C that when it is turned down, as shown at Fig. 3, it will enter the notched or slotted plate G and retain the end-gate in place, and when it is turned up, as shown at Fig. 1, it will allow the end-gate to be swung open.

The cam-latch H has a projection, $h'$, on one side, which rests beneath the end of the slot $g$, when the cam is turned down, as shown at Fig. 3, and thus prevents the handle $h$ from resting on the bottom B, and springing upward to release the cam, from jolting of the wagon or other causes.

As already described, the cam is turned upward to release, and downward to secure, the end-gate.

I claim—

The wagon-bottom B, having the hole $g'$, partially covered by the slotted plate G, and arranged to operate in combination with the cam H, having projection $h'$, and the hinged end-gate C, substantially as and for the purpose specified.

In testimony that I claim the foregoing as my invention I have hereunto affixed my signature this 29th day of December, 1875.

WARREN H. THOMAS.

Witnesses:
W. B. RICHARDS,
G. D. COLTON.